United States Patent
Jeffery

(10) Patent No.: US 8,151,309 B2
(45) Date of Patent: *Apr. 3, 2012

(54) AUDIO/VIDEO AND DATA SIGNAL REDISTRIBUTION SYSTEM

(75) Inventor: Ross A. Jeffery, Uxbridge (CA)

(73) Assignee: North Vu Inc., Toronto (CA)

( * ) Notice: Subject to any disclaimer, the term of this patent is extended or adjusted under 35 U.S.C. 154(b) by 604 days.

This patent is subject to a terminal disclaimer.

(21) Appl. No.: 11/928,774

(22) Filed: Oct. 30, 2007

(65) Prior Publication Data

US 2008/0060040 A1 Mar. 6, 2008

Related U.S. Application Data

(63) Continuation of application No. 09/928,332, filed on Aug. 14, 2001, which is a continuation of application No. 09/522,940, filed on Mar. 10, 2000, now Pat. No. 6,567,981, which is a continuation-in-part of application No. 09/127,963, filed on Aug. 3, 1998, now Pat. No. 6,038,425.

(51) Int. Cl.
*H04N 7/173* (2011.01)
*H04N 7/16* (2011.01)

(52) U.S. Cl. ............... 725/99; 725/86; 725/94; 725/95; 725/98; 725/100; 725/105; 725/118; 725/120; 725/122; 725/143; 725/148

(58) Field of Classification Search ................ 725/78
See application file for complete search history.

(56) References Cited

U.S. PATENT DOCUMENTS 3,878,468 A 4/1975 Falconer et al.
(Continued)

FOREIGN PATENT DOCUMENTS

CA 2148090 5/1994
(Continued)

OTHER PUBLICATIONS

Burroughs, R. S., "A Point of Entry Interface for 2-Way Broadband Information Delivery", Proceedings from Eleven Technical Sessions, 42nd Annual Convention and Exposition of the National Cable Television Association, San Francisco, California, Jun. 6-9, 1993, pp. 52-61.

(Continued)

*Primary Examiner* — Justin Shepard
(74) *Attorney, Agent, or Firm* — Mark B. Eisen; Dimock Stratton LLP

(57) ABSTRACT

A system for redistributing a multiple input audio/video and data signals having a redistributing device equipped to receive signals in a multiple formats and redistribute a selected signal to a user's premises over conductors, preferably existing twisted-pair telephone wire. The redistributing device is in interactive communication with a communications interface located in the user's premises which receives user-input control signals and contains switching circuitry which routes the selected signal to the user's premises where it is received by the receiving unit such as a television receiver. A single redistributing device services an entire multi-user network from a common distribution point, and services multiple users independently. The system of the invention does not interfere with normal use of the telephone network, so users can interactively access services provided by the system and use the telephone at the same time. In one preferred embodiment the system of the invention dynamically allocates frequencies and modulation techniques to various output signals, to maximize spectral efficiency and minimize interference and cross-talk.

8 Claims, 5 Drawing Sheets

U.S. PATENT DOCUMENTS

| | | | |
|---|---|---|---|
| 5,130,793 | A | 7/1992 | Bordry et al. |
| 5,528,283 | A | 6/1996 | Burton |
| 5,528,286 | A | 6/1996 | Goolcharan |
| 5,566,232 | A | 10/1996 | Sizer, II |
| 5,574,964 | A * | 11/1996 | Hamlin ............................ 725/78 |
| 5,586,121 | A | 12/1996 | Moura et al. |
| 5,612,730 | A | 3/1997 | Lewis |
| 5,613,190 | A | 3/1997 | Hylton |
| 5,621,455 | A | 4/1997 | Rogers et al. |
| 5,633,614 | A | 5/1997 | Decramer |
| 5,638,426 | A | 6/1997 | Lewis |
| 5,673,205 | A | 9/1997 | Brunson |
| 5,825,806 | A | 10/1998 | Tuttle et al. |
| 5,903,372 | A | 5/1999 | Czerwieg |
| 5,905,942 | A | 5/1999 | Stoel |
| 5,936,660 | A | 8/1999 | Garantz |
| 5,950,111 | A | 9/1999 | Georger et al. |
| 6,038,425 | A | 3/2000 | Jeffrey |
| 6,088,368 | A | 7/2000 | Rubinstain et al. |
| 6,181,334 | B1 * | 1/2001 | Freeman et al. .............. 725/138 |
| 6,188,871 | B1 | 2/2001 | Kitamura et al. |
| 6,202,211 | B1 * | 3/2001 | Williams, Jr. ................... 725/78 |
| 6,378,130 | B1 | 4/2002 | Adams |
| 6,385,647 | B1 * | 5/2002 | Willis et al. ................... 709/217 |

FOREIGN PATENT DOCUMENTS

| | | |
|---|---|---|
| CA | 2167801 | 2/1995 |
| CA | 2162858 | 9/1995 |
| CA | 2211803 | 8/1996 |
| CA | 2214650 | 9/1996 |
| CA | 2221291 | 11/1996 |
| CA | 2173781 | 10/1997 |
| EP | 0408236 | 1/1991 |
| EP | 0409702 | 1/1991 |
| WO | WO 91/07018 | 5/1991 |
| WO | WO 98/30002 | 7/1998 |
| WO | 99/37092 | 7/1999 |

OTHER PUBLICATIONS

Kim, J. H. and Yim, C. S., "ADSL/HDSL Technologies and Applications in VOD and Multimedia Services", IEEE International Broadcasting Convention, Sep. 14-18, 1995, pp. 346-350.

Li, Victor O. K. and Liao, Wanjiun, "Distributed Multimedia Systems", Proceedings of the IEEE, vol. 85, No. 7, Jul. 1997, pp. 1063-1108.

Im, Gi-Hong, "Performance of a Local Distribution System for Interactive Multimedia TV", GLOBECOM '95: IEEE Global Telecommunications Conference, Singapore, Technical Program Conference Record, vol. 1, pp. 178-182.

Lundgren, C. W. and Natarajan, P. S., "Single Mode Fiber Transport and Coaxial Distribution of Video on Demand", IEEE Global Telecommunications Conference: Communications Broadening Technology Horizons, Conference Record vol. 2, Houston, TX Dec. 1-4, 1986, pp. 889-893.

Kerr, Gordon, "A Review of BT's Interactive TV Trials", IEE Colloquium on Interactive Television, Nov. 2, 1995, pp. 6/1-6/5.

Kerr, Gordon, "BT's Video on Demand Trials", Proceedings of the Second International Workshop on Community Networking: Integrated Multimedia Services to the Home, Jun. 20-22, 1995, Princeton, NJ, pp. 199-204.

Eldering, Charles, A., "Customer Premises Equipment for Residential Broadband Networks", IEEE Communications Magazine, Jun. 1997, vol. 35, No. 6, pp. 114-121.

"New Products", IEEE Communications Magazine, Apr. 1984, vol. 22, No. 4, pp. 48-51.

Schulman, Martin, A., "End-to-End Performance Measurement for Interactive Multimedia Television", Proceedings, International Test Conference 1995, Washington, DC, Oct. 21-25, 1995, pp. 979-985.

Harman, D. D. et al, "Local Distribution for Interactive Multimedia TV to the Home", Proceedings of the 1994 1st International Workshop on Community Networking, Integrated Multimedia Services to the Home, San Francisco Bay area, CA, Jul. 13-14, 1994, pp. 175-182.

Zurburg, Dean, "Video on Demand—Which Way To Turn?", 1997 Conference on Communications, Power and Computing WESCANEX'97 Proceedings, Winnipeg, MB, May 22-23, 1997, pp. 218-221.

Dieuleveult F., de: "Transmission vidéo sur paire torsadée". Electronique Radio Plans, FR, SPE, Paris, No. 545, Apr. 1993, pp. 25-32 XP000368046 ISSN: 1144-5742 (English translation also attached).

Bartsch et al., "Lessons Learned from Multimedia Field Trials in Germany", IEEE Communications Magazine, Oct. 1997, pp. 40-45.

Sutherland et al., "Residential Video Service", IEEE Communications Magazine, Jul. 1992, pp. 36-41.

Choi et al., "A Trial Networking for VOD", Proc. Second Int'l Workshop on Community Networking, Jun. 20-22, 1995, Princeton NJ, ISBN 078032756X, pp. 205-211.

* cited by examiner

AUDIO/VIDEO AND DATA SIGNAL REDISTRIBUTION SYSTEM

CROSS-REFERENCE TO RELATED APPLICATIONS

This application is a continuation of application Ser. No. 09/928,332 filed Aug. 14, 2001, which is a continuation of application Ser. No. 09/522,940 filed Mar. 10, 2000 now U.S. Pat. No. 6,567,981, which is a continuation-in-part of application Ser. No. 09/127,963 filed Aug. 3, 1998 now U.S. Pat. No. 6,038,425.

FIELD OF THE INVENTION

This invention relates to communications systems. In particular, this invention relates to an interactive audio/video and data telecommunications system which integrates and redistributes audio/video and data signals received in multiple formats to multiple users over existing telephone wires.

BACKGROUND OF THE INVENTION

Modern society is heavily reliant upon many different kinds of audio/video and data telecommunications services affecting all aspects of daily life. Television is one of the most popular sources of information and entertainment. Other sources of information and entertainment include computer networks such as the Internet, which today offers services such as interactive shopping, banking, gaming, venues for discussion and social intercourse and many other products and services, home video games, video/DVD movie rentals, radio and television broadcasts and the like. These types of services provide a virtually unlimited variety of information and entertainment to practically every corner of the world.

However, these services have evolved independently over many decades and as such are provided in different formats and through disparate channels of distribution. For example, television signals can be received by off-air antenna, cable redistribution networks (CATV) and satellite broadcasts, but access to each signal source is independent of the others and requires specialized equipment and/or service providers. A television set can be equipped to receive signals from all of these sources, but only one at a time so some form of switching equipment at the receiving end is required to change the television signal source. Further, each of these signals itself comprises many channels, which complicates attempts to pool the services into a single integrated system. The Internet is accessible by modem over CATV or telephone wires, but is typically connected to a computer which is a completely separate viewing system.

Prior to the invention there has never been a system available for integrating these types of services, which would allow a user to instantaneously access any channel provided by any telecommunications or broadcast service using a single system. Moreover, prior to the invention there has not been an inexpensive system available which is interactive, simple to use and delivers any desired telecommunications and broadcast service over a single network of twisted pair telephone wires.

A new technology known as Digital Subscriber Line (DSL) is now available which carries high-bandwidth data to subscribers over PSTN telephone lines using a form of fixed frequency Direct Multitone (DMT). Where the subscriber is located in proximity to a telephone company which offers DSL service, data rates of up to 7 Mb/s are available, which permits the continuous transmission of video (including motion video) and audio signals without interfering with telephony (voice) transmissions.

In conventional analog telephony the data rate is limited by filters which convert digital data streams to analog form suitable for PSTN telephone transmission cables, which is very bandwidth intensive. In DSL, digital data is transmitted without conversion to analog, which allows for a much wider transmission bandwidth in a signal that can be separated from the analog voice signal. However, in order to accomplish this over existing PSTN wiring, all existing digital-to-analog filters must be removed, which is a very expensive process, which increases as the distance from the telephone company facility increases, and results in a high cost to DSL subscribers. Moreover, outdoor PSTN cable is subject to degradation, and any signal carried on outdoor wiring is vulnerable to ambient em interference and attenuation due to multiple taps and other connections. These factors combine to limit the usefulness of fixed frequency DMT.

It would accordingly be advantageous to provide a system for integrating broadcast and telecommunications signals from a variety of sources, which can utilize conventional twisted-pair telephone wiring within a subscriber's premises and does not rely upon transmission to the premises via outdoor PSTN cables utilizing dynamic frequency allocation (DFA). It would further be advantageous to provide such a system which permits interactive signal selection of virtually any type of broadcast or telecommunications signal by a user, and which maximizes definition and minimizes interference by adaptively allocating bandwidth to signals based on the nature of the signal and its data content, amongst other factors.

SUMMARY OF THE INVENTION

The present invention provides an interactive audio/video and data redistribution system which pools the various broadcast and telecommunications services available to a user, integrating these services in a single system which redistributes audio/video and data signals received in multiple formats to multiple users. The invention allows each user to remotely select and control the audio/video or data signal source desired to be viewed or accessed and provides access any available broadcast and telecommunications system through a single receiving unit, in the preferred embodiment a television receiver or microprocessor appliance (MPA) such as a computer. Further, the invention provides an interactive system which is simple to operate and allows the user to utilize interactive services such as those available over the Internet. Still further, the invention can be implemented over existing telephone wires, which considerably reduces the cost of the system and renders installation of the system easy and inexpensive.

The invention accomplishes this by providing a redistributing device which is equipped to receive telecommunications signals in any desired format and redistribute selected signals to a user's premises. The redistributing device is in interactive communication with an interface located in the user's premises which receives control signals from the user input using, in the preferred embodiment, a conventional infrared (IR) remote control device, and contains switching circuitry which routes the selected signal to the user's premises where it is received by the receiving unit, preferably a television receiver or microprocessor appliance (MPA) such as a computer.

A single redistributing device services an entire multi-user network from a common distribution point for conventional telephone wire, and services multiple users independently.

Thus, in the preferred embodiment the redistribution occurs within the users' premises or a central office and is not reliant upon transmission across outdoor cable.

Moreover, the system of the invention does not interfere with normal use of the telephone network, so users can be interactively access services provided by the system and use the telephone at the same time, or any existing off-air or CATV wiring, so users have the option of receiving services over these networks as well.

Each user may select access to a telecommunications system or program from a menu-driven user interface, which may provide many levels of sub-menus with options specific to the particular telecommunications service selected by the user. The users within the network thus can instantaneously and independently access any available telecommunications service regardless of the input signal format.

In the preferred embodiment the system of the invention is equipped with channel lockout for parental control, optionally a signal processor which prevents videotaping of received programs, a magnetic card reader or other access control device, a system log which records all activities and services accessed by users within the network for billing purposes, a system override which allows the system operator to deny access to selected users of selected services, or redistribute selected programming (for example a message in an emergency situation), and other features which will become apparent from the description below.

In the preferred embodiment, the system of the invention dynamically selects and allocates a redistribution frequency and modulation technique suitable for the particular service (signal) selected by each user. This may be based on such factors as interference from other sources, attenuation due to cable length (to subscriber premises) and cable type, signal-to-noise ratio, data density of the signal and signal sharing with other subscriber-selected signals being redistributed.

The system of the invention also permits multiple broadcasts to be carried within a single signal using suitable modulation techniques, for example quadrature amplitude modulation (QAM). This allows the same twisted pair to accommodate command signals, rebroadcast output signals, analog voice signals and data signals at the same time; and permits a single subscriber to receive more than one broadcast or telecommunications service at a time, superposed within a single signal, so that different receivers within a single subscriber premises can receive different services.

One preferred embodiment of the invention is a browser-based system, according to which the selected signals are redistributed in browser-compatible format. This allows the system of the invention to be used with computers, either connected to a browser-adapted wall plate (using, for example, TCP/IP or open transport protocols), or within an intranet or local area network. In this embodiment redistributed motion video data signals are displayed by commercially available motion video helper software, with or without associated audio, in compressed or uncompressed format.

The system of the invention also has the capacity to monitor, track and record subscriber usage for each broadcast or telecommunications service, and to selectively block or enable specific services to individual subscribers. The system may also include billing software which invoices subscribers based on usage of each service over any specified period.

The system of the invention thus integrates Internet, television, video-on-demand, telephony, data transfer, gaming, music-on-demand and T-commerce (television-based commerce) into a single interactive system which can be made accessible to each unit within a building or complex, or alternatively to each subscriber within a local loop, all over conventional twisted-pair telephone wiring. Further, because the system of the invention is connected to all broadcast and telecommunications services, it can be used to reroute long distance telephone service to Internet telephony (VoIP and VoFR), with attendant cost savings to the subscriber, and to route an Internet connection (eg. audio/video data signals) to a computer or a television receiver with the appropriate signal format.

The present invention thus provides a system for redistributing a plurality of audio/video and data signals over conductors, comprising a server, and a redistributor for receiving a plurality of input signals, comprising for each input signal, a demodulator for demodulating the signal, the server controlling an output channel selection of the input signal responsive to one or more control signals input into a communications interface, wherein the redistributor dynamically selects and allocates a redistribution frequency suitable for each output signal based on one or more of: attenuation due to interference from other sources, attenuation due to cable length, signal loss, signal-to-noise ratio, data density of the output signal and signal sharing with other output signals.

The present invention further provides a method of redistributing a plurality of audio/video and data signals to a plurality of communications interfaces over conductors, comprising the steps of (a) receiving a plurality of input signals at a signal redistributor, (b) demodulating each input signal, (c) processing each input signal to a format suitable for switching, (d) switching an output of the redistributor according to one or more control signals input into a communications interface, (e) selecting and allocating a redistribution frequency suitable for the output signal based on one or more of: attenuation due to interference from other sources, attenuation due to cable length, signal loss, signal-to-noise ratio, data density of the output signal and signal sharing with other output signals, and (f) routing the output of the redistributor to the communications interface for transmission to a receiving device.

In a further aspect of the invention the output signal comprises a plurality of superposed signals, whereby each of a plurality of communications interfaces within a single subscriber premises is tuned to a different frequency so as to transmit to its associated receiver one of the superposed signals.

BRIEF DESCRIPTION OF THE DRAWINGS

In drawings which illustrate by way of example only a preferred embodiment of the invention.

DETAILED DESCRIPTION OF THE INVENTION

Figure 1:
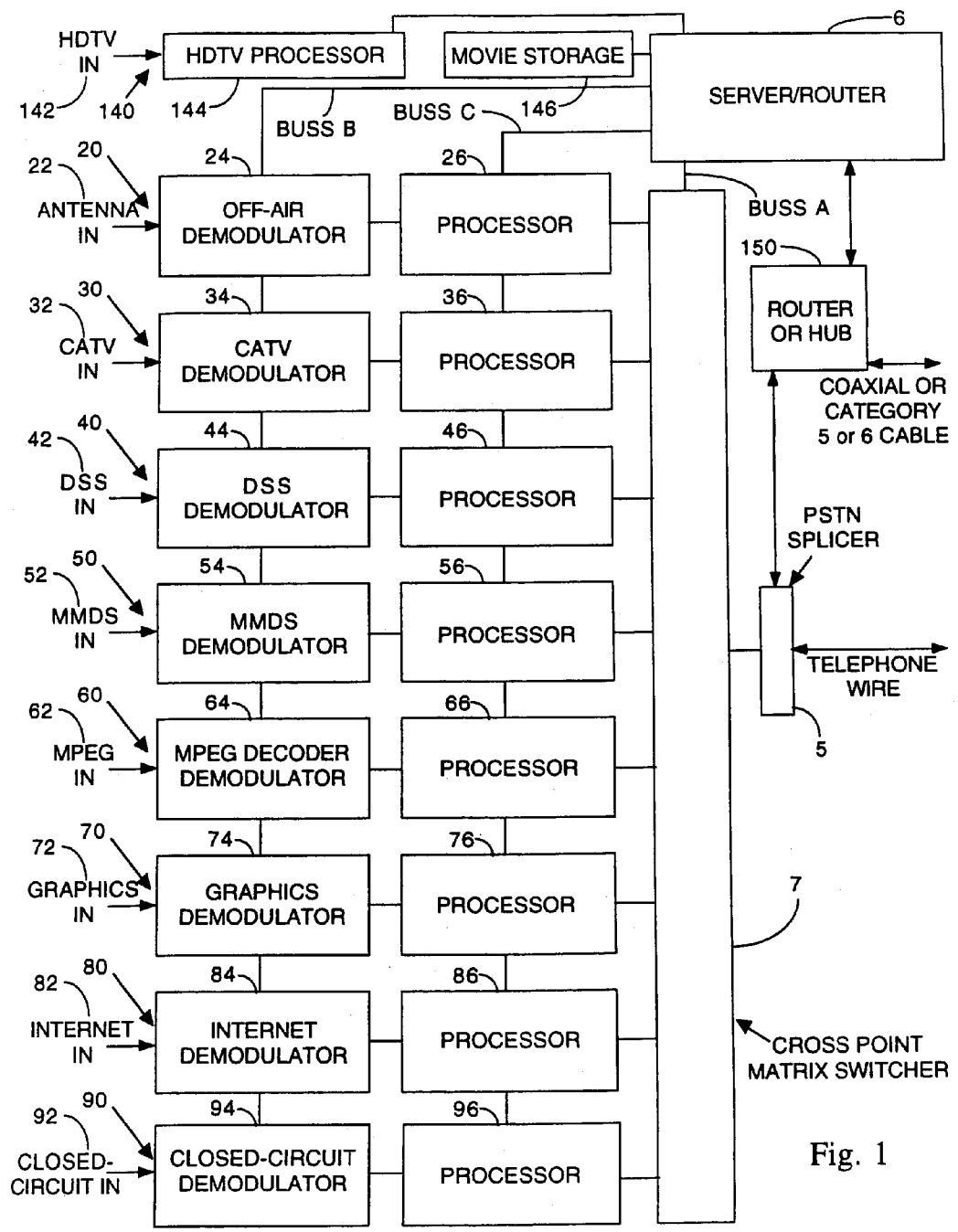
FIG. 1 is a block diagram of a redistributor according to the invention.

As illustrated in FIG. 1, the invention comprises a redistributing device 8 and communications interface 100. The redistributor 8 serves as a telecommunications signal receiver and router/distributor, receiving a plurality of audio/video and data input signals and redistributing user-selected signals to multiple users from the common distribution point of the telephone wiring at the multi-user site or telecommunications office location. The communications interface 100 is located in each individual unit and delivers the selected input signal from the redistributor to the receiving device 2, in the preferred embodiment a conventional television receiver or MPA, and receives control signals input by the user for transmission to the redistributor 8 to select the input signal and communicate interactively where the selected input permits. As used herein "audio/video and data signals" refers to all telecommunications and broadcast signals containing digital or analog information which may comprise audio information, video information, data, communications protocol, or any combination thereof.

The redistributor 8 receives signals in multiple formats, processes the signals and, based on commands transmitted through the communications interface 100, redistributes the selected signal to the user. The command signals are transmitted to the redistributor 8, and the signals are distributed to the users, over conductors which preferably comprise twisted-pair telephone wire 1. In one preferred embodiment command signals are transmitted to the redistributor 8 on the voice (red-green) twisted pair, and redistributed signals are transmitted to the receiver 2 on the unused (yellow-black) pair.

In rare cases where existing telephone wiring will not accommodate this arrangement, for example in the case of a single pair cable, four-conductor twisted-pair cabling can be installed for the system of the invention or the building ground may be used as a common ground for the redistribution and command signal pathways, allowing the invention to operate effectively over a single pair of telephone wires, as described in greater detail below. Alternatively, both the command signals and the redistributed signal(s) can be dynamically modulated on top of the voice signals (typically at 4 to 7 kHz) and around the command signals (for example at 180 kHz) by suitable modulation techniques, such as quadrature amplitude modulation (QAM), occupying any unused frequency between the voice and command signal basebands and up to 1 GHz. In new buildings where the system of the invention is contemplated in the building plans, eight pair cabling may be installed (instead of two or four pair cabling) to maximize the advantages provided by the invention, which would facilitate the servicing of multiple television receivers 2 in a single unit as described below.

The redistributor 8 is installed at a multi-user site, which may for example be an apartment or condominium, commercial high rise, hospital, school, a local loop in a neighborhood telephone system, a compound or complex containing many buildings, etc. The multi-user site may be any site or network which provides a common distribution point for conventional twisted-pair telephone wire, for example PSTN, network category five copper cable or any other local area network cabling, distributed to individual units within the site. Existing wiring in such multi-user sites is almost invariably, as a minimum, four-conductor twisted-pair copper wire distributed from a common distribution point to individual units. Examples of multi-user sites are apartment buildings, office towers, hospitals, a block of detached houses networked in a local loop, schools (through intercom wiring to individual classrooms), etc.

Each input comprises a demodulator and processor for the particular format of the input signal. The preferred embodiment illustrated in FIG. 1 incorporates various types of signal inputs by way of example only. The system of the invention may be equipped to receive and redistribute any video, audio, audio/video or data signal in any format, including all remote audio/video and data signals and local audio/video and data signals (such as a signal from a closed-circuit security camera or local- or wide-area network server), and the invention is not intended to be limited to the specific types of signals illustrated and described below.

Off-air input 20 is adapted to receive off-air television signals through an antenna 22 configured to receive VHF and UHF frequency bands, including FM broadcast bands. The off-air signal is received by a frequency-agile off-air demodulator 24 with a tuner preferably compatible with at least NTSC, PAL, and SECAM video formats, which processes the separate audio and video signals to baseband for injection into off-air processor 26, which in turn processes the signals for switching, as described below. The input frequency selection is controlled by commands transmitted by the user with a conventional remote control through communications interface 100 to the server 6, which controls the cross point matrix switcher 7 through data buss A.

CATV input 30 is adapted to receive CATV signals through conventional coaxial cable 32. The CATV signal is received by a frequency-agile CATV demodulator 34 with a tuner adapted to receive CATV signals throughout sub, low, mid, hyper and super bands in both inter-harmonically related carriers (IRC) and harmonically related carriers (HRC). The demodulator 34 processes the separate audio and video signals to baseband for injection into CATV processor 36 which processes the signals for switching. The input frequency selection is controlled by commands transmitted by the user through communications interface 100 to the server 6, which controls the cross point matrix switcher 7 through data buss A.

DSS input 40 is adapted to receive DSS (direct satellite) signals received by satellite dish 42 through a frequency agile DSS demodulator 44, which processes the separate audio and video signals to baseband for injection into the DSS processor 46. The demodulator 44 is preferably adapted to receive the DSS signal in both C and KU bands, independent of protocol and format, with a tuner compatible with NTSC, PAL, and SECAM and a receiver bandwidth of approximately 0.900 to 21.8 GHz. The demodulator 44 processes the separate audio and video signals to baseband for injection into DSS processor 46 which processes the signals for switching. The input frequency selection is controlled by commands transmitted by the user through communications interface 100 to the server 6, which controls the cross point matrix switcher through data buss A.

MMDS input 50 is adapted to receive MMDS (multi-point multi-distribution system) signals received MMDS antenna 52 through a frequency agile MMDS demodulator 54, which processes the separate audio and video signals to baseband for injection into the MMDS processor 56. The demodulator 54 is preferably adapted to receive the MMDS signal in 2.4 GHz and 22 GHz bands, independent of protocol and format, with a tuner compatible with NTSC, PAL, and SECAM. The demodulator 54 processes the separate audio and video signals to baseband for injection into DSS processor 56 which processes the signals for switching. The input frequency selection is controlled by commands transmitted by the user through communications interface 100 to the server 6, which controls the cross point matrix switcher 7 through data buss A.

MPEG input 60 is adapted to receive MPEG signals through MPEG decoder for processing by demodulator 64, which processes the separate audio and video signals to baseband for injection into the MPEG processor 66. The demodulator 64 is preferably adapted to receive the MPEG signal in 1, 2 or 4, for example from a video server or video library. The demodulator 64 is independent of protocol and format, and has a tuner compatible with NTSC, PAL, and SECAM. The demodulator 64 processes the separate audio and video signals to baseband for injection into MPEG processor 66 which processes the signals for switching. The input selection is controlled by commands transmitted by the user through communications interface 100 to the server 6, which controls the cross point matrix switcher 7 through data buss A.

Graphics input 70 is adapted to receive component video signals from a video source such as a video game server 72 for processing by demodulator 74, which serves as a VGA or computer generated video and audio signal to composite converter. Text, graphical user interfaces navigation screens and video games and are separated into audio and video baseband signals for injection into the graphics processor 76 which processes the signals for switching. The input selection is controlled by commands transmitted by the user through communications interface 100 to the server 6, which controls the cross point matrix switcher 7 through data buss A.

Internet input 80 is adapted to receive component video signals from a computer 82 for processing by demodulator 84, which serves as a VGA or computer generated video and audio signal to composite converter. Internet browser and communications is not limited by protocol or architecture. Internet processor 86 processes the signals for switching. Navigation is controlled by commands transmitted by the user through communications interface 100 to the server 6, which controls the cross point matrix switcher 7 through data buss A.

Closed-circuit input 90 is adapted to receive component video signals from a closed-circuit camera 92, for example a security camera, for processing by demodulator 94, which serves as a VGA or computer generated video and audio signal to composite converter. Closed-circuit processor 96 processes the signals for switching. Switching between different cameras is controlled by commands transmitted by the user through communications interface 100 to the server 6, which controls the cross point matrix switcher 7 through data buss A.

The server 6 is preferably an open architecture, platform independent and scalable computer having as a minimum a 486 microprocessor. The server 6 controls the upstream data from the communications interface 100 and all demodulated inputs, and manages the database as described below to provide accounting, billing, audit trails and programme history. The server 6 provides many communications ports for ISDN, fibre, satellite, PSTN, analog and digital input-output devices and/or any other desired accessory. The server 6 also functions as a router to control and route information through the data busses A, B and C.

The demodulator data bus B interconnects all demodulators and decoders and interfaces to the server 6. The buss B is not limited to protocol, speed, frequency, form factor or format.

The processors 16, 26, 36, 46, 56, 66, 76, 86 and 96 process their respective incoming signals into a format that is able to be switched by the cross point matrix switcher 7 and sent to the communications interface 100 over unshielded twisted pair copper cable. The processors 16, 26, 36, 46, 56, 66, 76, 86 and 96 each match the impedance of the signal to the output impedance; raise the baseband of the demodulated signal (for example to 300 kHz); equalize the high frequency components (for example at 3 dB) and increase the level of chroma; and increase the peak-to-peak voltage (vpp) of the demodulated signal. The processors 16, 26, 36, 46, 56, 66, 76, 86 and 96 also convert and translate upstream control signals received by the cross point matrix switcher 7 from the communications interface 100 and route the control signals to the server 6 via data buss B.

The cross point matrix switcher 7 is preferably a wideband multi-channel non-blocking many-to-one switch, which is not limited by size, bandwidth, speed, form factor, protocol, architecture, format or cable type. Control signals received by and output from the processors 16, 26, 36, 46, 56, 66, 76, 86 and 96 are transmitted to the server 6, which controls the cross point matrix switcher 7 and routes the selected input to the output of the cross point matrix switcher 7 for transmission back to the communications interface 100. A separate cross point matrix switcher 7 is provided for and dedicated to each communications interface 100 installed in the individual units within the multi-user site.

The processor data buss C interconnects all processors 16, 26, 36, 46, 56, 66, 76, 86 and 96 and interfaces to the server/router 6. The buss C is not limited to protocol, speed, frequency, form factor or format.

Data buss A interconnects each cross point matrix switcher 7 with the server/router 6. The buss A is not limited to protocol, speed, frequency, form factor or format. The output of cross point matrix switcher 7 is connected to a standard or custom telephone or twisted copper splice block 5. Type Bix and no. 66 are typically used, however the configuration of the splice block 5 does not effect the operation of the invention. The splice block 5 conveys the output of the cross point matrix switcher 7 to the copper pair (red-green) of the existing telephone system or PSTN. The splice block 5 may also be used for category five or 10baseT cabling.

The redistributor 8 may also include an HDTV processor 144 for processing HDTV signals received at HDTV input 140 by an antenna, satellite dish or other suitable receiver 142. The HDTV processor 144 is connected directly to the server 6, which controls the channel selection and routes the HDTV signal through a high speed data router or hub 150 that distributes HDTV signals from the server 6 over coaxial cable or category five or six cable (10BaseT) network within the multi-user environment. Utilizing DFA and selective modulation techniques, the originating HDTV 8VSB signals may be down-converted to base band for transmission on existing PSTN wiring from the redistributor 8 to the communications interface 100. Alternatively, the 8VSB signal may be converted by other complimentary modulation techniques such as (but not limited to) QAM, QPSK, PSK and the like, for redistribution over PSTN wiring from the redistributor 8 to the communications interface 100 for re-emulation to HDTV standard. If category five or six cable (which typically has 4 pairs) is used, the HDTV signal requires only two pairs and the two unused pairs of the category five or six cable may be coupled to the PSTN splicer block 5, as shown in FIG. 1, to effectively merge the telephone wiring (red/green and yellow/black) with the unused pairs in the category five or six cable.

Additionally, a movie storage database 146 may be connected directly to the server 6, which controls the movie selection responsive to control signals input by the user based on a directory accessed by the user through a movie submenu.

Figure 2:
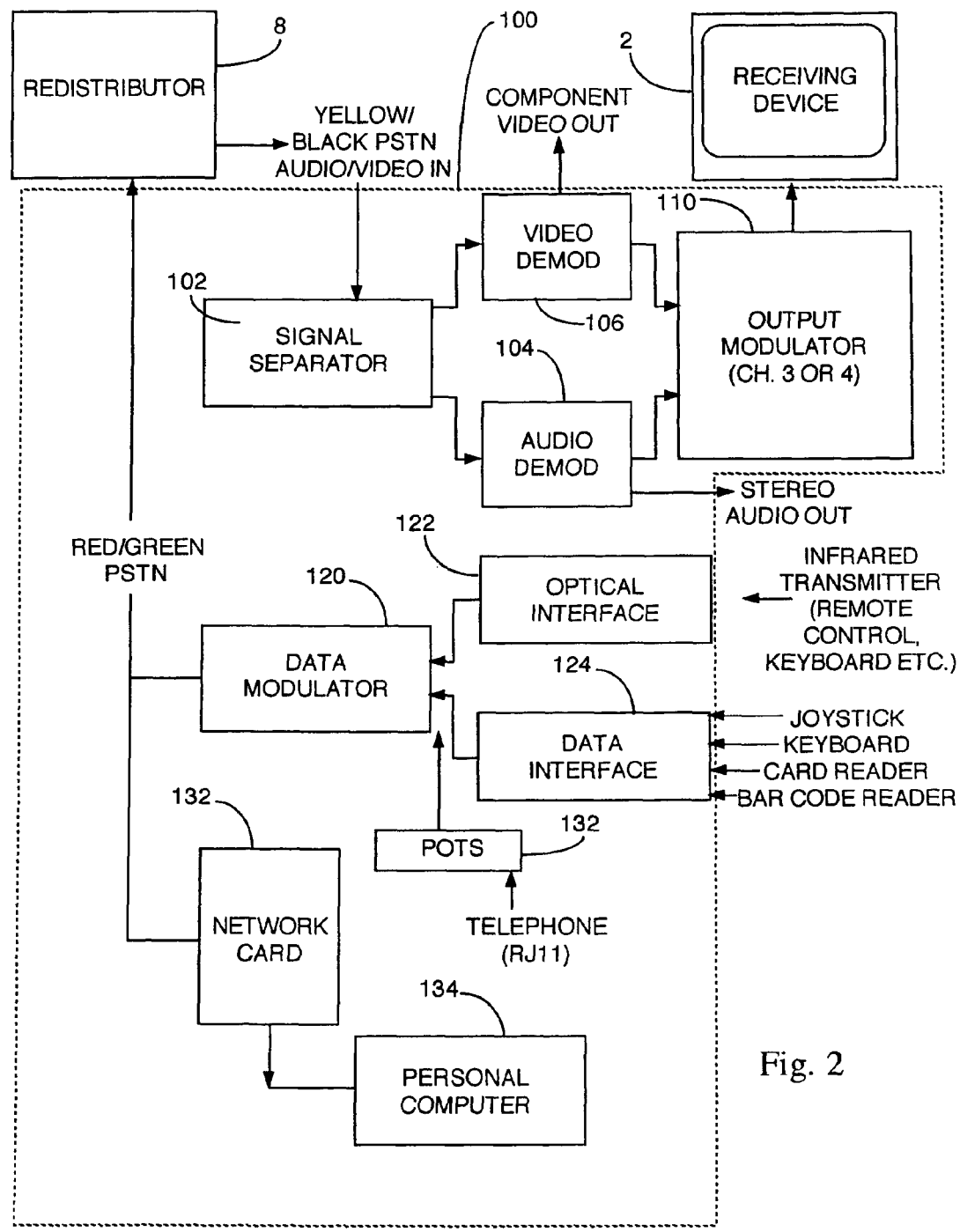
FIG. 2 is a block diagram of a communications interface for the redistributor of FIG. 1.

The audio/video and data signals output by the redistributor 8 may be transmitted to the communications interfaces 100 in the individual units over both used and unused pairs of the PSTN. The PSTN is not limited by voltage or frequency, and can transmit the full bandwidth of audio/video and data signals over a considerable distance with minimal signal loss. The communications interface 100, illustrated in FIG. 2, may be a self-contained wall plate with one or more RJ11 ports, or alternatively may be a separate external device which plugs into the RJ11 port of a conventional telephone wallplate and provides, as desired (but not limited to), one or more RJ11 ports, F connectors, RJ45, composite audio/video (RCA)

ports, component video ports, firewire ports, and/or universal serial bus (USB) ports for the receiver 2 and optionally a bypass port for the telephone.

Figure 3:
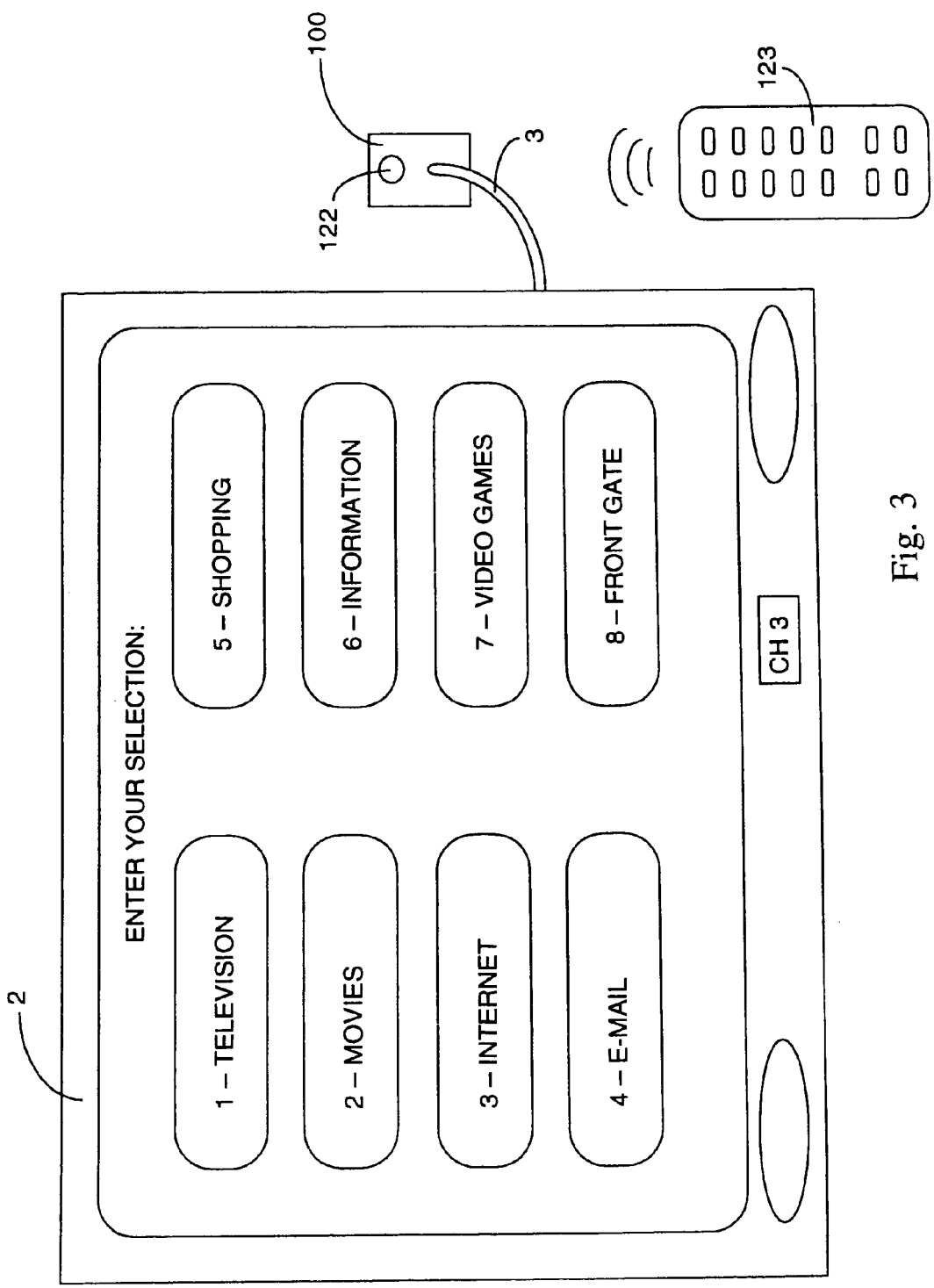
FIG. 3 is a diagrammatic illustration of a user interface.

At the communications interface 100, illustrated in FIG. 3, the modified combination of the signals are received from redistributor 8, and audio/video signals are separated into individual audio and video signals by separator 102. In the preferred embodiment the video signal ranges from DC to 4.5 MHz NTSC, PAL or SECAM, and the audio (analog telephone) is a sub-carrier ranging between (but not limited to) 4.6 to 5.0 MHz, preferably around 4.7 MHz.

The output of the separator 102 is fed into the audio and video demodulators 104, 106, respectively. The video output of the separator 102 is preferably at an impedance of 75 to 100 ohms, depending on line conditions and the setting of the video modulator in the redistributor 8, which will compensate for any mismatch loss and common mode rejection. The video signal may be reshaped to clip the H sync and colour burst peaks using a horizontal synchronization attenuator and amplifier that is controlled by the redistributor 8, to regulate the sync level to the receiver 2 so that illegal recording of video may be prevented (a typical television receiver is able to lock to the video signal with as little as 15 units of sync, whereas videotape recorders generally require a minimum of 25 units of sync to lock effectively to the input signal).

Optionally a signal-to-noise detector can be provided in the communications interface 100, which signals the redistributor 8 to boost the signal output level if the signal-to-noise ratio decreases below a threshold level. This would allow the redistributor 8 to compensate for the disparate length of telephone cable between the splicer block 5 and the communications interfaces 100 in the various individual units (for example, a penthouse apartment will experience less attenuation from a roof-mounted redistributor 8 than a basement apartment located within the same multi-user site). It is also contemplated that a system analyzer for testing the various signals used by the system would plug directly into the RJ11 port in the communications interface 100, and could communicate directly with the server 6 for recording system analysis results.

The video demodulator 104 then converts the reshaped video into a standard composite video signal at 1 vpp for injection to the modulator 110. The demodulator 104 also filters common mode rejection and other radio frequency and electromagnetic interference. The modulator 110 modulates the video signal to a selected channel such as channel 3 using conventional NTSC, PAL, or SECAM modulation techniques. The modulator 110 is preferably phase lock looped with saw filtering, and frequency agile within the 1 GHz bandwidth spectrum. The communications interface 100 may be provided with a user-operated switch (not shown) for selection of channel 3 or 4, which is standard for domestic video receivers.

The output of the modulator 110 is connected directly to the receiving device 2. In the preferred embodiment the receiving device 2 is a television set, however it may be a videotape recorder, stereo receiver, MPA or any other device capable of receiving an audio/video or data signal.

The audio sub-carrier signal is received from the output of the separator 102 and demodulated (stereo on monaural) by audio demodulator 104 to a common audio base band signal of approximately (but not limited to) a 20 Hz to 20 kHz frequency range with an impedance which can vary from 75 to 600 ohms, for injection to the modulator 110 and optionally directly to an audio output. The demodulator 104 also filters out radio frequency and electromagnetic interference.

The data modulator 120 sends instructions from the interfaces upstream to the redistributor 8, receiving a varying data stream from one of a plurality of interfaces, which preferably includes an optical interface such as an infrared receiver 122 comprising a photoreceptor that receives signal from a common hand held IR remote control device 123. The remote control 123 is used to input numeric information which controls the signal input selection, and the channel selection where the input signal includes multiple channels (for example a CATV television signal). The IR receiver 122 may be built into the communications interface 100, or may be wired to the communications interface 100 remotely and mounted at a convenient position such as on the television receiver 2. In the preferred embodiment the remote control device 123 will control the power, mute and volume, and picture/sound settings of the television receiver 2 directly through the television receiver's IR remote system. All other selections are controlled by the redistributor 8 based on control signals input by the user into the infrared receiver 122 using the remote control device 123, and transmitted to the redistributor over live (ring and tip) PSTN wiring.

The communications interface 100 may also include a data port 124 for interfacing with other types of data entry devices, for example a keyboard, a mouse, track pad and/or joystick, a bar code and/or swipe card reader, and any other data input device which facilitates the input of alphanumeric information for purposes of interactivity. The data port 124 is not limited by protocol, standards, speed, clock or voltage.

The data modulator 120 is preferably also inductively coupled, or direct capacitively coupled, to the PSTN telephone connection as at 132. The common PSTN is passed directly onto the user without compromise so that telephone, facsimile and Internet functions all operate normally. The modulation scheme is selected according to the upstream data requirements. FSK has been found to work favourably. The frequency bandwidth is variable and the frequency allocation is agile. A frequency in the range of 160 to 190 kHz has proven effective and does not interfere with telephone signals (which are typically in the range of 300 Hz to 1.5 kHz). The data modulator 120 incorporates high and low pass filters, and may operate at data rates ranging from 300 to 30,000 bps or as otherwise desired. The circuitry of the communications interface 100 may be programmed into an ASIC or like hardware.

The network card 132 is able to interface with any twisted pair wire, whether included in the telephone cable bundle or a separate category three, five, six or other cable. The network card is not limited to IEEE 10baseT standards, preferably QAM, QPSK, PSK etc. The network card 132 provides an optional interface for connecting client or server computers to the system of the invention. Any microprocessor-based appliance 134 may be connected to the network card 132 and may include peripherals such as printers, scanners, modems etc. The network card 132 may be advantageously employed in newer multi-user environments, where existing telephone wiring typically provides at least three twisted pairs (often between four and eight pairs) in the PSTN cable.

In one preferred embodiment information input into the communications interface 100 using these upstream devices is transmitted to the redistributor 8 over the red/green pair of the telephone cable, which is used for the ring and tip lines of the telephone service. These control signals are preferably transmitted in a data carrier having a frequency of approximately 180 kHz. The content of the control signals is sufficiently sparse as to require very little bandwidth, and the signal is preferably filtered so as not to interfere with the telephone service. The ring/tip twisted pair may be used to provide the power supply for the communications interface 100, or if insufficient power is available from the telephone service the communications interface 100 may be powered directly from a transformer (not shown) in the redistributor 8 outputting a DC signal along with the redistributed output signal over the yellow/black twisted pair.

Interactivity using the remote control 123 or other infrared device permits the user to utilize such services as shopping, banking and electronic commerce, gaming etc. which are presently available over the Internet. It is also possible to transmit audio/video and data signals over the yellow/black PSTN without interfering with the incoming video signal. This would increase the level of interactivity and permit such complex data exchange functions as video conferencing.

In the preferred embodiment for connection to a multiple-pair PSTN network a plurality of carriers are established using modulation techniques such as frequency division multiplexing, orthogonal frequency division multiplexing, QAM, FSK, PSK, QPSK etc. as follows: DC to 4.5 Mhz for video data signals; 4.55 Mhz for serial audio (BTSC stereo audio) signals; 8.5 to 12 Mhz for high speed data signals; and 12 to 13 Mhz for voice data. Carriers at higher frequencies experience higher losses due to attenuation, em and rf interference, so in this embodiment the voice carrier is preferably constrained to a narrow bandwidth to minimize losses. Other bands may be selected as may be suitable for various available modulation techniques. Spread spectrum transmission methods conventionally used on AC power lines can also be used to provide signals for extra voice and data lines, a printer port, pay-per-use software etc.

To install the system of the invention, the redistributor 8 is located at a multi-user site in the vicinity of the common distribution point for the telephone wiring at the site. This may for example be a master telephone panel in a commercial office tower, apartment building or hospital, a local loop distribution box in a residential neighborhood, etc. The output of the cross point matrix switcher 7 is connected to the PSTN yellow/black pair, or any other unused twisted pair in the PSTN cable, for transmitting the selected input signal to the communications interfaces 100. The input to the cross point matrix switcher 7 is connected to the red/green pair (or equivalent ring and tip conductors) in the PSTN cable, for transmitting control signals from the communications interface 100 to the redistributor 8.

One or more communications interfaces 100 are installed in the individual units within the site. Each communications interface 100 provides at least a remote control interface such as an optical interface 122 connected to the red/green PSTN, and an output for connection to the receiving device 2, such as a conventional 75 ohm coaxial connector, connected to the yellow/black PSTN. A network card 132 is optionally connected to a second unused pair in the PSTN cable for interfacing with a personal computer, microcomputer or computer network 134.

The system may be managed by a service provider, who can either pay the various input signal providers (where the input signal is a fee-based service) and charge the individual units a fee for use of the system, or bill the individual units for payment directly to the signal providers. The server 6 maintains a database through which all input signal and channel selections input by users in the multi-user site are tracked and recorded for billing purposes. This information can also be used by signal providers to produce viewership and other statistical and related information. The system of the invention thus has the capacity to monitor, track and record subscriber usage for each broadcast or telecommunications service, and to selectively block or enable specific services to individual subscribers. The system may also include billing software which invoices subscribers based on usage of each service over any specified period.

The service provider preferably has the ability to insert or substitute programming into any output signal at any time, for example commercial messages, emergency broadcasts or the like, through a signal override resident in the server 6.

The service provider may also bundle the telephone service with other services, for example to resell long distance telephone services through a dedicated port. A single twisted pair telephone cable is capable of carrying multiple voice, video and data lines, and could service many lines and extensions in the unit. The reselling scheme could include pay-per-use telephone services and any other telephone reselling scheme.

In the preferred embodiment the cover plate for the communications interface 100 provides contact switches which disconnect when the cover plate is removed, providing an immediate indication that the system is being tampered with to prevent attempts to pirate signal services.

In use, the receiving device 2, preferably a conventional television receiver, is maintained on channel 3 or 4 as optionally set by the user. When the television receiver 2 is turned on the redistributor defaults either to a main menu or to the last input signal selected by the particular user. An example of a main menu for the preferred embodiment is illustrated in FIG. 3. Each menu option provides a corresponding numerical selection parameter which is selected by the user via the remote control 23. The user selects their choice of input signal by entering the corresponding numeric selection into the remote control 123. The numeric selection is received by the optical interface 122 and a corresponding control signal is transmitted to the redistributor 8 over the red/green PSTN and transmitted to the server 6 via cross point matrix switcher 7.

The selected menu option may provide any number of levels of sub-menus. For example, if the "television" option is selected by entering the number "1" the server 6 may switch to a submenu offering the options "1—Off-Air", "2—CATV", "3—HDTV" and "4—DSS". Using the same remote control 123 the user selects the numeric value corresponding to the desired selection, and is prompted to enter the channel number. The main menu, sub-menus and prompt messages are generated by conventional browser software resident on the server 6. Selectable options may also be embedded in the vertical blanking interval of an incoming video signal, accessible by depressing a "hot key" on the remote control 123 when information (for example a web site URL) is displayed on the television receiver 2.

The server 6 signals the cross point matrix switcher 7 via data buss A to connect the selected input signal to the output of the matrix switch 90, and the input signal is transmitted to the communications interface over the yellow/black (or other unused) PSTN. If the input signal contains multiple channels, for example in the case of a television signal, the server 6 controls a tuner in the corresponding demodulator 14, 24 or 34 to pass the selected channel. The selected input signal may modulated to channel 3 or 4 and transmitted to the individual unit to be received on the user's television receiver 2 through a conventional coaxial or other two-conductor cable 3. Alternatively, a port can be provided for direct connection of the component video and audio to the television receiver, to be viewed in a "video" mode, which would eliminate the need for an output modulator 110 in the communications interface 100.

The capacity of the server 6 is selected having regard to the number of individual units within the multi-user site. The server 6 provides a separate cross point matrix or digital matrix switcher 7 for each individual unit, and can thus independently transmit an input signal to each unit irrespective of input signals selected by users in other units. The possible selection of input signals is limited only by the capacity of the redistributor 8 to receive signals in any particular format. Where an individual unit has more than one television receiver 2, where the telephone cabling contains extra twisted pairs the redistributor 8 may be equipped with a separate matrix switcher 7 for each television receiver 2 within the unit. Thus, an eight pair twisted cable can support up to four separate television receivers 2 in a unit, each television receiver using one pair for incoming and outgoing audio/video or data signals and another pair for transmitting control signals to the redistributor 8. This capacity can be increased even further by assigning an identifier number to each communications interface 100 within a unit, and using the ring/tip telephone pair to transmit control signals to the redistributor 8 for all television receivers 2 in the unit; the redistributor 8 receives the identifier number and routes the audio/video or data signal along the twisted pair associated with the particular communications interface 100 so identified.

Because the telephone wiring in an individual unit acts as a common distribution point for that particular unit, a scaled-down embodiment of the invention could be used to allow for controlling signals received by a television receiver 2 in the unit. For example, the redistributor 8 might receive off-air, closed-circuit and CATV signals transmitted to the unit by coaxial cable and 300 ohm wires, and when coupled to the telephone wiring in the manner indicated above a television receiver 8 can be switched remotely from one signal input to another.

In a further embodiment of the invention, communication occurs between the redistributor 8 and the receiver 2 over a single pair of telephone wires. In this embodiment the building ground conductor is used as a common ground for the redistribution and command signal conductors. In this embodiment redistributed signals are transmitted to the receiver over the ground and one of the ring/tip conductor pair, for example the ring conductor, and command signals are transmitted to the redistributor 8 over the ground and the other of the ring/tip pair, in this example the tip conductor. The ground differential can be compensated by DC restoration using an op amp to cancel any 60 Hz AC signal hum generated by the building power supply conductors. This embodiment is advantageously employed in older buildings which may have only a single pair of existing telephone wires, to thus avoid the need to install new wiring in order to implement the system of the invention.

Figure 4:
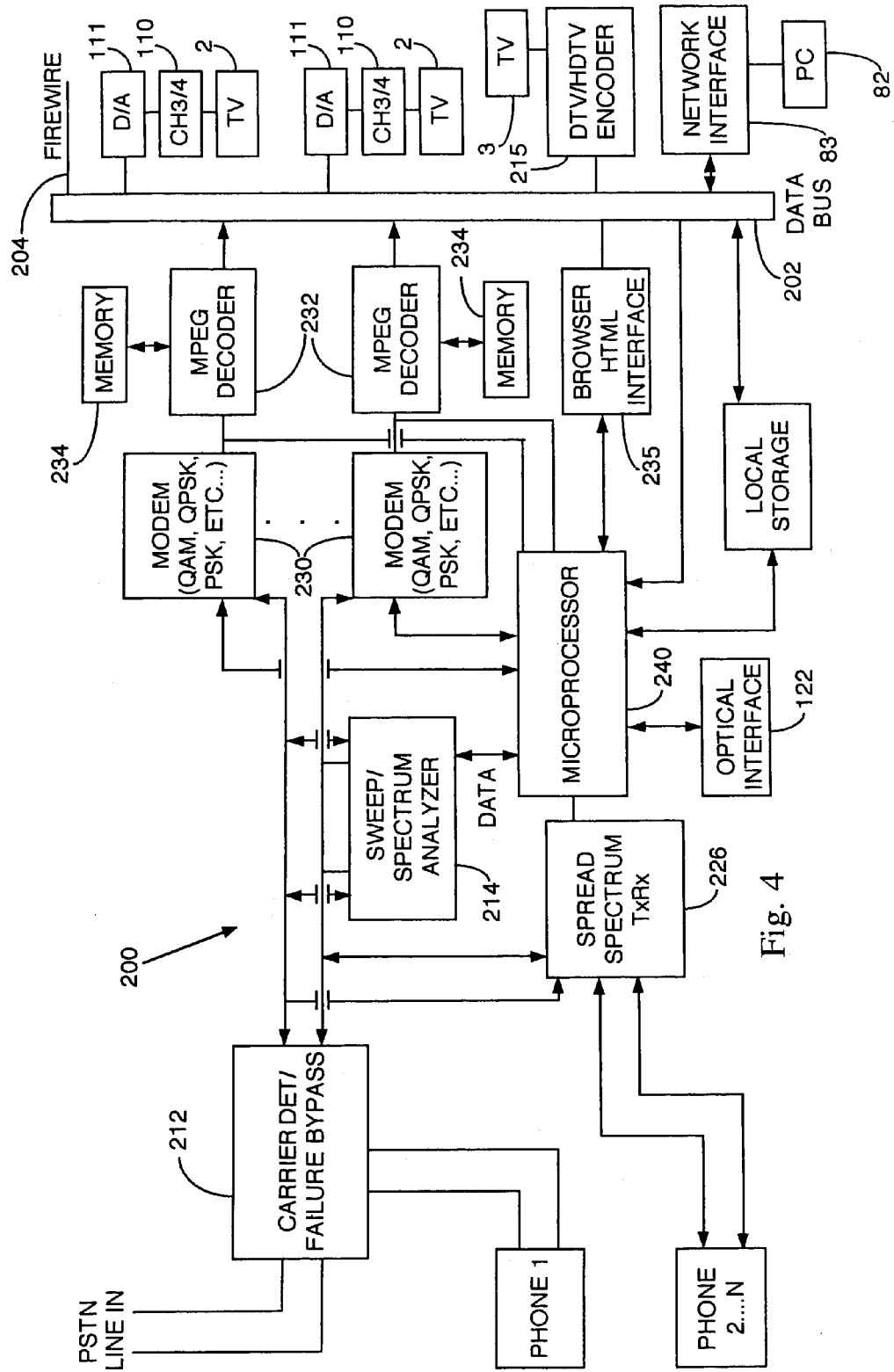
FIG. 4 is a block diagram of a communications interface for a further embodiment of the redistributor operating on a single twisted-pair telephone conductor.
Figure 5:
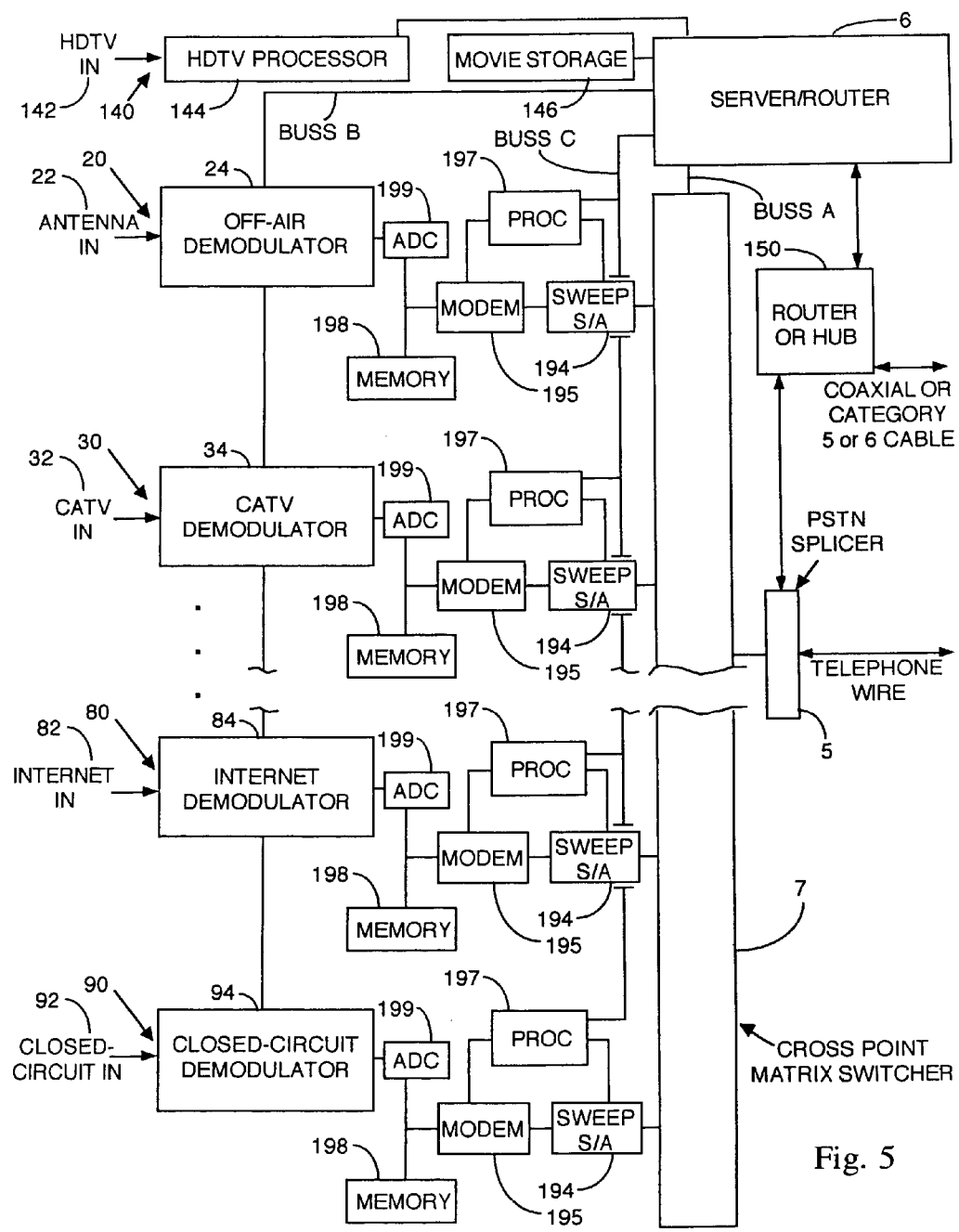
FIG. 5 is a block diagram of a redistributor adapted for the communications interface of FIG. 4.

FIG. 4 illustrates a communications interface 200 for a further embodiment of the invention operating over a single-pair PSTN network, or a single twisted pair of a multi-pair cable, with no reference to ground. Rebroadcast signals transmitted from the redistributor, illustrated in FIG. 5, are thus sent to the communications interface 200 over the ring and tip conductors, or any unused twisted pair in the PSTN cable. To accommodate the superposition of several signals onto the PSTN pair, input broadcast and telecommunications signals are re-modulated and dynamically allocated to selected frequencies within the redistributor output signal bandwidth.

For example, in the embodiment of FIG. 4 a plurality of carriers may be established as follows: DC to 7 kHz for voice; any available frequency for command signals; and 200 kHz and higher for video data signals, serial audio (BTSC stereo audio) signals, high speed data signals, voice/fax data and other digital signals. In this embodiment suitable modulation techniques such as QAM, FSK, PSK, QPSK etc. are employed to modulate the higher frequency output signals. To avoid interference and "cross-talk", in the preferred embodiment the system of the invention dynamically selects and allocates a redistribution frequency, and preferably a modulation technique/bit pattern, most suitable for the particular signal selected by each user.

FIG. 5 illustrates a redistributor for the communications interface 200 of FIG. 4, which modulates the redistributor output via any suitable modulation technique, preferably selected in the manner described below. As in the previous embodiment the redistributor may be equipped to receive and redistribute any video, audio, audio/video or data signal in any format, and representative inputs are shown by way of example only. The signal output of each demodulator is digitized by an analog-to-digital converter 199 and fed to a frequency-agile modem 195 capable of modulating the signal by QAM, QPSK, PSK, FSK, or any other suitable modulation technique. A memory 198, for example a frame store, is provided to conceal anomalies in the redistributed signal caused by momentary interruption of the input signal.

Processor 197 controls the modem 195 and sweep generator/spectrum analyzer 194, which pulses the PSTN line out at multiple frequencies, either when a new signal is selected by the user or preferably on a continuous basis, generating data representing the signal-to-noise ratio, carrier-to-noise ratio, attenuation, bits-to Hertz and as desired any other RF parameters of the input signal, for optimization of frequency allocation and selection of an appropriate modulation technique by the redistributor. Processor 197 controls the operation of the sweep generator/spectrum analyzer 194, analyzes data generated by the sweep generator/spectrum analyzer 194, and selects the frequency and modulation technique for the signal in the manner described below.

The rebroadcast signals received by the communications interface 200 are input to carrier detect/failure bypass 212, for example a solid state normally-closed double pole double throw relay, which monitors the input signal for a carrier at a designated frequency and if the carrier is not present diverts the PSTN signal to PHONE 1 to restore normal use of the PSTN line by telephone 1. In normal operating mode, i.e. with the redistributor output carrier present, the signal is fed to sweep generator/spectrum analyzer 214, which (like the redistributor's sweep generator/spectrum analyzer 194) pulses the PSTN line in at multiple frequencies, preferably on a continuous basis, to assess RF parameters of the input signal. The processor 240 controls the operation of the sweep generator/spectrum analyzer 214, analyzes data generated by the sweep generator/spectrum analyzer 214, and where a signal anomaly is detected signals the redistributor to reallocate the signal.

It is possible to program the system so that the processor 240 can dynamically reallocate frequencies and change modulation techniques, however in the preferred embodiment only the redistributor's sweep generator/spectrum analyzer 194 selects the frequency and modulation technique for each redistributed signal, and the sweep generator/spectrum analyzer 214 in the communications interface 200 merely signals the redistributor in the case of a signal anomaly.

All control and rebroadcast signals are processed within the communications interface 200 in the digital domain by digital signal processor 240, which may for example comprise a RISC or any other suitable microprocessor. Processor 240 also processes the subscriber's infrared commands received via optical interface 122 to generate control signals which are modulated to a designated frequency by QAM (or QPSK, PSK or any other suitable other protocol) modem 216. These signals are sent to the redistributor via the PSTN twisted pair to be processed in the manner described above.

The processor 240 outputs signal data to a frequency agile modem 230 capable of modulating the signal via QAM, QPSK, PSK, FSK or any other desired modulation technique. FIG. 4 illustrates a communications interface having two modems 230 by way of example, however the communications interface 200 may be provided with a separate modem 230 for each receiver 2 in the subscriber's premises. Each modem 230 outputs a demodulated signal to an MPEG decoder 232 (preferably having a dedicated memory 234 which conceals anomalies in the redistributed signal caused by momentary interruption due to signal overcrowding, frequency reallocation etc.), which outputs the digital signal to the data bus 202.

The processor 240 controls the modems 230 and receives data output by each modem 230 for distribution to graphics browser HTML interface 235, which outputs a browser-compatible signal to the data bus 202 that allows the video to be viewed on a microprocessing appliance such as a personal computer 82 through network interface 83. On command, the processor 240 outputs digitized video data to local video storage 244, for example for time-shifting programming, video replay etc. In the preferred embodiment the processor 240 also outputs the digitized video data directly to the data bus 202 for communication to peripherals and consumer electronic devices through a FireWire interface 204 or other communications protocol.

Telephony is preferably conducted through spread spectrum transceiver 226, coupled to the output of carrier detect/failure bypass 212, to allow the use of any desired number of telephone extensions.

The allocation of frequency by the redistributor is based on a programmed priority, for example using a lookup table or fuzzy logic subroutine, which may consider such factors as interference from external sources, attenuation due to cable length (from the redistributor to the subscriber unit), signal loss, signal-to-noise ratio, data density of the signal and signal sharing with other subscriber-selected signals being redistributed. As an example, a facsimile data signal redistributed to one user would ordinarily be allocated a lower frequency than a standard definition television signal being simultaneously redistributed to another user in the network; a full motion video high definition signal to a third user would be allocated an even higher frequency. In each case the redistributor "tunes" the respective communications interface 200 to the frequency of the redistributed signal using a signal frequency select pulse which precedes the redistributed signal. The communications interface 200 thus adaptively alters the reception frequency responsive to instructions from the redistributor.

Moreover, this dynamic frequency allocation occurs in response to command signals from other units within the network. Where for example a fourth user requests a high speed digital data signal for computer networking, the redistributor reviews the existing signal distribution and, based on programming reflecting the factors referred to above and the demands of the newly requested signal, may reallocate frequencies of existing output signals in order to accommodate the new signal with maximum spectral efficiency. Similarly, where an external emr source arises which causes interference at frequencies in use by the system, the redistributor may switch the affected signals to other frequencies to avoid the ambient interference. The redistributor may be programmed to take into account factors other than those previously indicated, which are referenced by way of example only.

In this embodiment the redistributor may also be programmed to select a modulation technique suitable for the output signal demands at any particular time, considering the above factors and also selecting a bit pattern for optimal performance (pathological signals may require larger bandwidth while pseudorandom signals typically require a narrower bandwidth). As with frequency allocation, this process is dynamic and provides an "on demand" architecture that makes full use of the available bandwidth, allowing multiple unrelated signals to be superposed on a single carrier.

This allows the a single twisted pair to accommodate command signals, rebroadcast output signals and analog voice signals at the same time; and permits a single subscriber to receive more than one broadcast or telecommunications service at a time, superposed on a single carrier and modulated to different frequencies, so that different receivers 2 within a single subscriber unit can receive different services over the same telephone line. The redistributor can tune different communications interfaces 200 within the subscriber premises to different frequencies, and thus each communications interface 200 is tuned to the particular frequency of the redistributed output signal corresponding to the control signal received by that communications interface 200.

To install this embodiment of the system of the invention, the redistributor is located at a multi-user site in the vicinity of the common distribution point, and the output of the cross point matrix switcher 7 is connected to the PSTN ring and tip conductor pair or other twisted pair in the PSTN cable, as are the communications interfaces 200. The input to the cross point matrix switcher 7 is also connected to the ring and tip conductors or other twisted pair for transmitting control signals from the communications interface 200 to the redistributor. In this embodiment the redistributor discriminates between bandwidths allocated to command signals and other bandwidths, to thus accept commands from the user; likewise, the communications interfaces 200 each comprise a high pass filter (stop band at 10 kHz) which transmits to the receiver 2 bandwidths allocated to redistributed signals but not analog voice signals (which are fed through a bypass to the RJ11 telephone port).

One preferred embodiment of the invention is a browser-based system, according to which the selected signals are redistributed in browser-compatible format. This allows the system of the invention to be used directly with computers, either connected to a browser-adapted wall plate (using, for example, TCP/IP or open transport protocols), or within an intranet or local area network. In this embodiment redistributed motion video, digital stereo sound, etc. signals can displayed by commercially available helper software, in compressed or uncompressed format.

The data bus 202 thus distributes the signal from the redistributor, incorporating a plurality of broadcast and telecommunications services in the manner described above, to any suitable receiver 2 including a browser-equipped computer 82. Standard television receivers 2 receive an analog signal output from digital-to-analog converter 111, modulated to channel 3 or 4 by modulator 110 as in the previous embodiment. Digital and high-definition television receivers 3 receive a DTV or HDTV signal output from encoder 215. Computers 82 receive a digital graphics browser-based signal through network interface 83, and peripheral or computer electronic devices receive a digital signal through FireWire interface 204. The number and permutations of available signals and receiving devices 2 are virtually unlimited in this embodiment of the invention.

It will be appreciated that the communications interface 200 may be designed for direct connection to the PSTN network, as a recessed wall fixture or a wall-mounted fixture. Alternatively, the communications interface 200 may take the form of a set-top box (STB) which is connected to a standard telephone wall plate by any suitable twisted-pair cable, in which case the infrared receiver 122 for accepting infrared command signals from the user is preferably integrated into the STB as in the embodiment of FIG. 2.

The invention having been thus described by way of example of the preferred embodiments, it will be apparent to those skilled in the art that certain modifications and adaptations may be made without departing from the scope of the invention, as set out in the appended claims.

I claim:

1. A system for redistributing a plurality of audio/video signals to a plurality of units, each unit being serviced through a common distribution point, each unit within the plurality of units having at least one communications interface, the system comprising a server, at least one demodulator for demodulating at least one input signal, the server controlling an output program selection of the input signals responsive to one or more control signals corresponding to each user-selected program input into one of the at least one communications interfaces in one of the plurality of units, and at least one processor for processing the at least one input signals for switching by one or more of matching an impedance of the input signal to an output impedance, raising a baseband of the signal, equalizing high frequency components, increasing a level of chroma, increasing a peak-to-peak voltage, optimizing frequency allocation, and selecting an appropriate modulation technique, and at least one switching device for routing the program selection using an internet protocol or other communication protocol or combination thereof, the switching device being controlled by the server and outputting an output signal containing the user-selected program, which output signal is sent only to the at least one communications interface within the one of the plurality of units and not to the others of the plurality of units, responsive to the one or more control signals input into the at least one communications interfaces, wherein the at least one communications interface in the one of the plurality of units receives the program selection for transmission of the user-selected program to at least one receiving device in the one of the plurality of units.

2. The system of claim 1 in which the input signals are in different signal formats.

3. The system of claim 1 in which the communications interface includes a data interface for receiving data from a keyboard, joystick, card reader, bar code reader or other data providing device.

4. The system of claim 1 in which the communications interface includes a network interface for transmitting data from a computer as an input signal to the demodulator.

5. A method of redistributing a plurality of audio/video signals to a plurality of units, each unit being serviced through a common distribution point, each unit within the plurality of units having at least one communications interface, the method comprising the steps of (a) receiving at least one input signals containing a program, (b) demodulating the at least one input signal, (c) processing the at least one input signals to a format suitable for switching by one or more of matching an impedance of the input signal to an output impedance, raising a baseband of the signal, equalizing high frequency components, increasing a level of chroma, increasing a peak-to-peak voltage, optimizing frequency allocation, and selecting an appropriate modulation technique, (d) selecting a processed input signal for redistribution to one unit of the plurality of units using an internet protocol or other communication protocol or combination thereof, according to one or more control signals corresponding to a user-selected program input into at least one communications interface in one of the plurality of units, and (e) sending an output signal containing the user-selected program only to the at least one communications interface within to the one of the plurality of units, responsive to the one or more control signals input into the at least one communications interface, and not to the others of the plurality of units.

6. The method of claim 5 in which the input signals are in different signal formats.

7. The method of claim 5 in which the communications interface includes a data interface for receiving data from a keyboard, joystick, card reader, bar code reader or other data providing device.

8. The method of claim 5 in which the communications interface includes a network interface for communicating data from a computer as an input signal to the demodulator.

* * * * *